(12) United States Patent
Hosoda

(10) Patent No.: US 6,612,582 B2
(45) Date of Patent: Sep. 2, 2003

(54) DUST LIP STRUCTURE OF OIL SEAL FOR OSCILLATION

(75) Inventor: Hironobu Hosoda, Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/034,037

(22) Filed: Dec. 20, 2001

(65) Prior Publication Data

US 2002/0079650 A1 Jun. 27, 2002

(30) Foreign Application Priority Data

Dec. 25, 2000 (JP) .................................. 2000-393550

(51) Int. Cl.[7] .............................................. B60T 11/236
(52) U.S. Cl. ...................................... 277/436; 277/560
(58) Field of Search ............................... 277/436, 560, 277/551, 553

(56) References Cited

U.S. PATENT DOCUMENTS

| | | | | |
|---|---|---|---|---|
| 5,579,814 A | * | 12/1996 | Jones et al. ............... | 141/383 |
| 6,322,082 B1 | * | 11/2001 | Paykin ....................... | 277/549 |
| 6,357,757 B1 | * | 3/2002 | Hibbler et al. .............. | 277/551 |
| 6,511,075 B1 | * | 1/2003 | Schmidt ..................... | 277/436 |
| 6,520,506 B2 | * | 2/2003 | Reinhardt et al. .......... | 277/549 |

FOREIGN PATENT DOCUMENTS

| | | | |
|---|---|---|---|
| EP | 0674120 A1 | * | 9/1995 |
| JP | 628429 | | 4/1994 |
| JP | 8178077 | | 7/1996 |
| JP | 11-13816 | * | 1/1999 |
| JP | 11-13817 | * | 1/1999 |
| JP | 11-13818 | * | 1/1999 |

* cited by examiner

Primary Examiner—William L. Miller
(74) Attorney, Agent, or Firm—Orum & Roth

(57) ABSTRACT

In a dust lip structure of an oil seal 20 for oscillation, a thickness of the front end portion of the dust lip 40 is substantially two thirds of an interference A of the first dust lip portion 41 with respect to the rod 13, and an outer diameter of the dust lip 40 is set to be in parallel to each of a front end side taper-like inner diameter portion 43B from the first dust lip portion 41 to a root portion of the second dust lip portion 42 and a base end side taper-like inner diameter portion 44B from the second dust lip portion 42 to the base end portion.

5 Claims, 3 Drawing Sheets

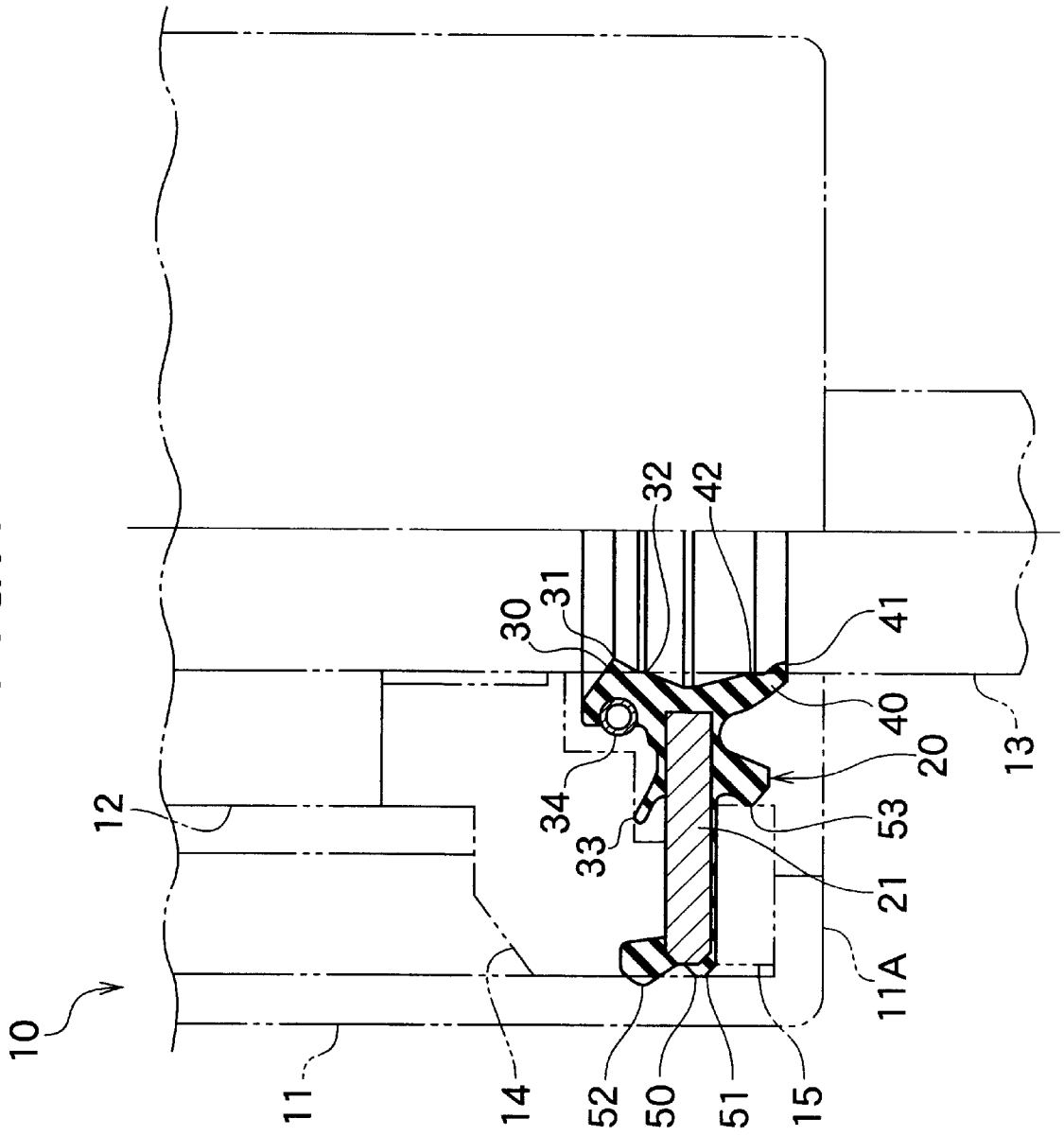

DUST LIP STRUCTURE OF OIL SEAL FOR OSCILLATION

BACKGROUND OF THE INVENTION

1. Field of the Invention

The present invention relates to a dust lip structure of an oil seal for an oscillation preferably employed for a hydraulic shock absorber or the like.

2. Description of the Related Art

In conventional art, in a dust lip structure of an oil seal for an oscillation, as described in Japanese Utility Model Application Laid-Open No. 6-28429, there is a structure having a dust lip in which a first dust lip portion in a front end side and a second dust lip portion in a base end side are in slidable contact with a rod with respective interferences. This oil seal is structured to reduce the thickness of a front end portion of the dust lip so as to prevent the first dust lip portion from being brought into close contact with the rod, increase a following property of the rod with respect to an axial eccentricity and increase a dust approach preventing effect.

However, in the conventional art, since the following property of the first dust lip portion with respect to the axial eccentricity of the rod is increased by reducing the thickness of the front end portion of the dust lip, a rigidity of the dust lip is reduced, and there is a possibility that the front end portion of the dust lip is drawn in the rod at a time of compressing the rod so as to be reversed. When the front end portion of the dust lip is reversed, a groove is generated in a contact portion between the rod and dust lip, and dusts, muddy water and the like are accumulated in the groove, thereby damaging the rod and further causing an oil leakage.

SUMMARY OF THE INVENTION

An object of the present invention is to prevent a dust lip from being reversed in an oil seal for oscillation.

The present invention relates to a dust lip structure of an oil seal for oscillation provided with a dust lip in which a first dust lip portion in a front end side and a second dust lip portion in a base end side are in slidable contact with a rod with respective interferences, in a core metal.

In one embodiment, a thickness of the front end portion of the dust lip is substantially two thirds of an interference of the first dust lip portion with respect to the rod. In another embodiment, this thickness is precisely two thirds.

An outer diameter of the dust lip is arranged to be parallel to each of a front end side taper-like inner diameter portion from the first dust lip portion to a root portion of the second dust lip portion and a base end side taper-like inner diameter portion from the second dust lip portion to the base end portion.

BRIEF DESCRIPTION OF THE DRAWINGS

The present invention will be more fully understood from the detailed description given below and from the accompanying drawings which should not be taken to be a limitation on the invention, but are for explanation and understanding only.

The Drawings

FIG. 1 is a cross sectional view showing an oil seal attaching portion of a hydraulic shock absorber;

FIGS. 2A and 2B are schematic views showing a dust lip, in which FIG. 2A is a schematic view showing a conventional structure and FIG. 2B is a schematic view showing a structure according to the present invention.

DESCRIPTION OF THE PREFERRED EMBODIMENTS

Figure 2A:
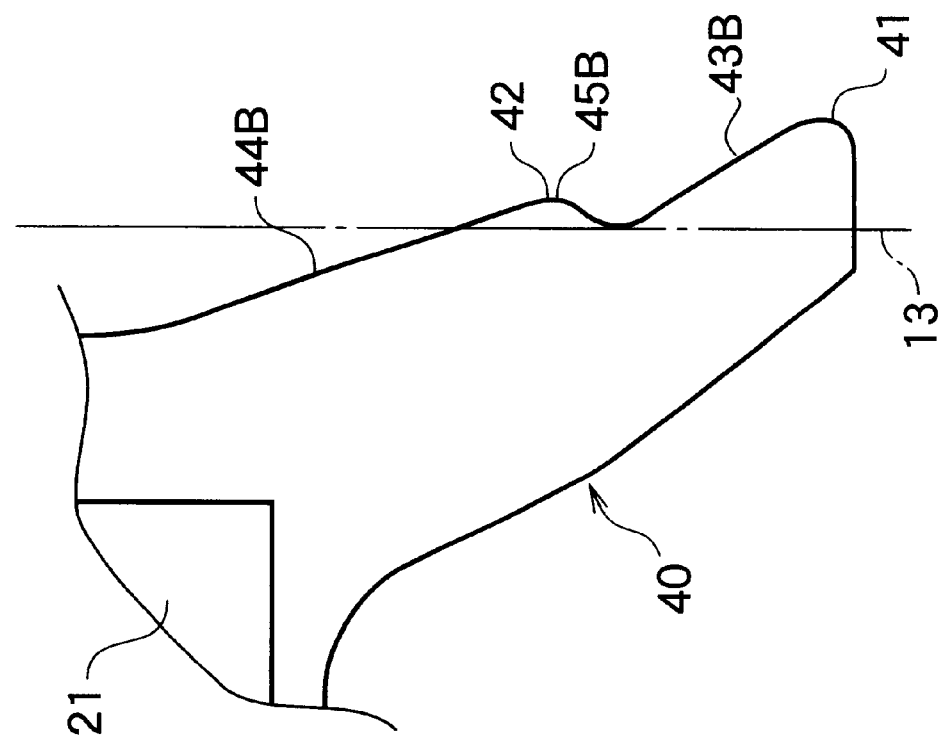

A hydraulic shock absorber 10 is structured, as shown in FIG. 1, such that a cylinder 12 is inserted in an outer tube 11 and an oil seal 20 is sealed in an opening portion through which a piston rod 13 of the cylinder 12 is inserted. A rod guide 14 is inserted and attached to an upper end opening portion of the outer tube 11 and the cylinder 12, and the oil seal 20 is inserted and attached to an upper end portion of the rod guide 14 so as to be fixed by a caulked portion 11A of the outer tube 11 via a washer 15.

The oil seal 20 is provided with an oil seal lip 30 (a first oil seal lip portion 31, a second oil seal lip portion 32 and a check lip portion 33), a dust lip 40 (a first dust lip portion 41 and a second dust lip portion 42), an outer peripheral lip 50 (a first outer peripheral lip portion 51 and a second outer peripheral lip portion 52) and a washer holding portion 53 which are made of an NBR (acrylonitrile-butadiene-rubber), by baking them in a core metal 21, and is structured such that a ring-like spring 34 is fastened to a back surface of the oil seal lip 30.

The oil seal lip 30 is structured such that the first oil seal lip portion 31 in the front end side is in slidable contact with the piston rod 13 with a predetermined interference and the second oil seal lip portion 32 in the base end side formed in a protruding shape toward the piston rod 13 is in slidable contact with the piston rod 13 with an interference smaller than the interference of the first oil seal lip portion 31, thereby preventing the oil from leaking from the cylinder 12.

The dust lip 40 is structured such that the first dust lip portion 41 in the front end side is in slidable contact with the piston rod 13 with a predetermined interference, and the second dust lip portion 42 in the base end side formed in a protruding shape toward the piston rod 13 is in slidable contact with the piston rod 13 with an interference smaller than the interference of the first dust lip portion 41, thereby preventing dust, muddy water or the like in the external portion from entering into the cylinder 12 side.

Figure 2B:
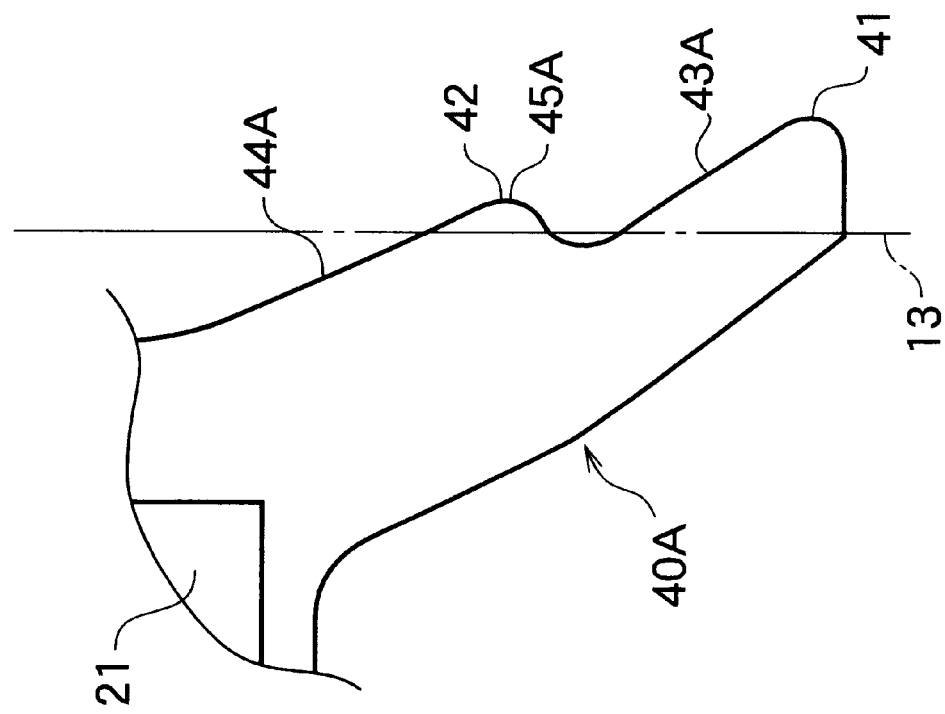
Figure 3:
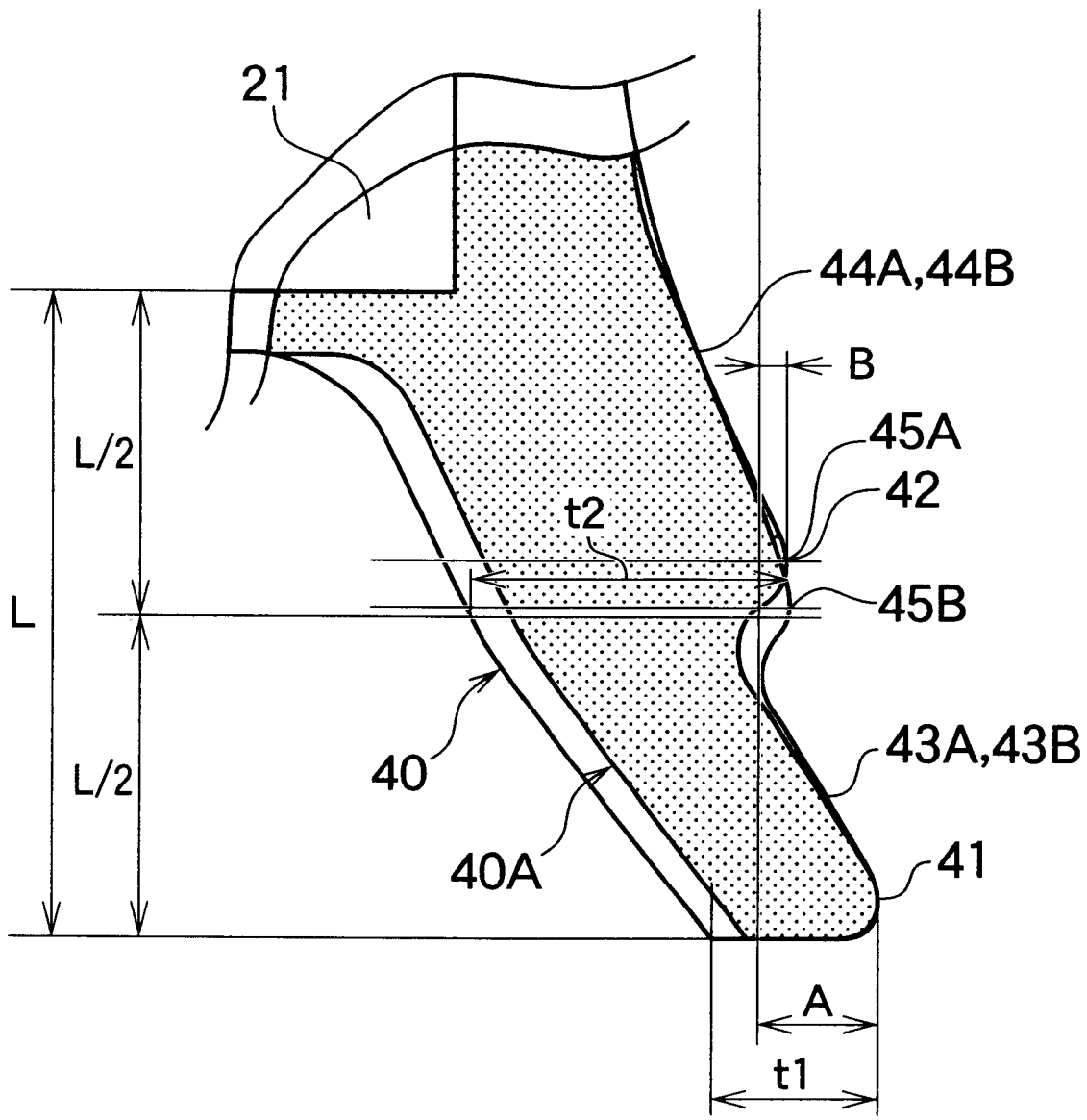
FIG. 3 is a schematic view showing a comparison between the conventional structure and the structure of the present invention as it relates to the dust lip.

Hereinafter, a description will be given of the dust lip 40 according to the structure (FIG. 2B) of the present invention in comparison with a dust lip 40A according to the conventional structure (FIGS. 2A and 3). FIGS. 2A, 2B and 3 show a rod outer diameter of the piston rod 13 drawn by a virtual line with respect to the dust lips 40A and 40, in which inner margins of the virtual line of the rod 13 correspond to the interferences of the first dust lip portion 41 and the second dust lip portion 42. Further, FIGS. 2A, 2B and 3 show the structures in which the interferences A and B of the first dust lip portion 41 and the second dust lip portion 42 and a lip length L from the core metal 21 are set to be equal to each other between the dust lip 40A and the dust lip 40. Further, in FIG. 3, the dust lip 40A and the dust lip 40 are drawn in an overlapping manner so as to compare a whole shape thereof.

In this case, with respect to the dust lips 40A and 40, the tolerance of the thickness (including a manufacturing tolerance) is ±10% and the tolerance of a center position of an axial length L (including a manufacture tolerance) is also ±10%.

(Conventional Structure) (FIGS. 2A and 3)

(a) The thickness of the front end portion of the dust lip 40A is set to be substantially equal to the interference A of the first dust lip portion 41 with respect to the piston rod 13. The outer diameter of the dust lip 40A is set to be in parallel to each of a front end side taper-like inner diameter portion 43A from the first dust lip portion 41 to a root portion of the second dust lip portion 42 and a base end side taper-like inner diameter portion 44A from the second dust lip portion 42 to the base end portion.

(b) A contact position 45A of the second dust lip portion 42 in the dust lip 40A with respect to the piston rod 13 is arranged in the base end side, rather than a substantially center position of the axial length L from the core metal 21 to the front end portion of the dust lip 40A.

(Structure of the Present Invention) (FIGS. 2B and 3)

(a) The thickness of the front end portion of the dust lip 40 is arranged to be substantially ⅔ (two thirds) of the interference A of the first dust lip portion 41 with respect to the piston rod 13, and the outer diameter of the dust lip 40 is arranged to be parallel to each of a front end side taper-like inner diameter portion 43B from the first dust lip portion 41 to a root portion of the second dust lip portion 42 and a base end side taper-like inner diameter portion 44B from the second dust lip portion 42 to the base end portion. Accordingly, the thickness of the dust lip 40 is wholly increased in comparison with that of the dust lip 40A. Rubber volume is increased 20 to 30% in comparison with the conventional situation, and rigidity is also increased.

(b) A contact position 45B of the second dust lip portion 42 in the dust lip 40 with respect to the piston rod 13 is arranged near a substantially center position of the axial length L from the core metal 21 to the front end portion of the dust lip 40.

In one embodiment, the dust lip 40 is particularly structured such that a thickness t1 of the front end portion is 0.8 mm and a thickness t2 of the second dust lip portion 42 at the contact position 45B with respect to the piston rod 13 is 1.4 mm.

Therefore, according to the present embodiment, the following effects can be obtained.

(1) The thickness of the front end portion of the dust lip 40 is set to be substantially ⅔ (two thirds) of the interference A of the first dust lip portion 41 with respect to the piston rod 13. The outer diameter of the dust lip 40 is set to be parallel to each of a front end side taper-like inner diameter portion 43B from the first dust lip portion 41 to a root portion of the second dust lip portion 42 and a base end side taper-like inner diameter portion 44B from the second dust lip portion 42 to the base end portion. Accordingly, in comparison with conventional oil seals in which the thickness of the front end portion of the dust lip 40A is set to be substantially equal to the interference A of the first dust lip portion 41 with respect to the piston rod 13, it is possible to increase the thickness of the dust lip 40 so as to ensure rigidity of the entire dust lip 40, thereby preventing the front end portion of the dust lip 40 from being drawn in the rod 13 when the rod 13 is compressed and being reversed. At this time, if the thickness and the rigidity of the dust lip 40 are excessively increased, the reverse preventing function is improved, however, the eccentrically following property of the first dust lip portion 41 with respect to the rod 13 is deteriorated. However, according to the thickness mentioned above defined by the present invention of the dust lip 40, the eccentrically following property is not deteriorated.

(2) The contact position 45B of the second dust lip portion 42 with respect to the piston rod 13 is arranged near a substantially center position of the axial length L from the core metal 21 to the front end portion of the dust lip 40. In the oil seal in which the contact position 45A of the second dust lip portion 42 with respect to the piston rod 13 is arranged in the base end side rather than a substantially center position of the axial length L from the core metal 21 to the front end portion of the dust lip 40A, according to the conventional art, the length of the thin portion in the front end side in the range from the first dust lip portion 41 of the dust lip 40A to the root portion of the second dust lip portion 42 becomes excessively large, whereby it is impossible to ensure the rigidity of the front end side. In the oil seal in which the contact position of the second dust lip portion 42 with respect to the rod 13 is arranged in the front end side rather than the portion close to the substantially center of the axial length L from the core metal 21 to the front end portion of the dust lip, the length of the thin portion in the front end side in the range from the first dust lip portion 41 to the root portion of the second dust lip portion 42 becomes excessively small, thereby deteriorating the eccentrically following property of the first dust lip portion 41 with respect to the rod 13. On the contrary, in the oil seal 20 in which the contact position 45B of the second dust lip portion 42 with respect to the rod 13 is defined as mentioned above according to the present invention, it is possible to make the length of the thin portion in the front end side of the dust lip 40 proper so as to ensure the rigidity of the front end side, and it is possible to also secure the eccentrically following property of the first dust lip portion 41 with respect to the rod 13.

While preferred embodiments of the present invention have been detailed with reference to the drawings, the arrangement to be implemented according to the present invention is not limited to the embodiments described, and it is to be understood that design changes and variations may be made without departing from the scope of the invention.

As mentioned above, according to the present invention, it is possible to prevent the dust lip from being reversed in the oil seal for oscillation.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A dust lip structure of an oil seal for oscillation provided with a dust lip in which a first dust lip portion in a front end portion and a second dust lip portion in a base end portion are in slidable contact with a rod said first dust lip portion being in contact with said rod at a first contact position with a first interference, said second dust lip portion being in contact with said rod at a second contact position with a second interference, said oil seal has a metal core between said dust lip and an oil seal lip, a thickness of the front end portion of the dust lip is substantially ⅔ of the first interference of the first dust lip portion with respect to the rod, and an outer diameter of a front end side of the dust lip is set to be parallel to each of an inner diameter of said front end portion and an inner diameter of the base end portion.

2. A dust lip structure of an oil seal for oscillation accordingly to claim 1, wherein the contact position of the second dust lip portion with respect to the rod is arranged substantially near a center of an axial length from the metal core to the contact position of the first dust lip portion.

3. A dust lip structure of an oil seal for oscillation according to claim 1, wherein the thickness of the front end portion is 0.8 mm and the thickness of the base end portion at the second contact position is 1.4 mm.

4. A dust lip structure of an oil seal for oscillation according to claim 1, wherein said second interference is smaller than said first interference.

5. A dust lip structure of an oil seal for oscillation according to claim 1, wherein the outer diameter of the front end portion is substantially larger than the outer diameter of the rod.

* * * * *